United States Patent Office 3,422,191
Patented Jan. 14, 1969

3,422,191

COMPOSITIONS AND METHODS FOR TRANQUILIZATION EMPLOYING SALTS OF N-MORPHOLINE ETHANOL

Alfred Halpern, Great Neck, N.Y., assignor to Synergistics, Inc., New York, N.Y., a corporation No Drawing. Original application Jan. 21, 1965, Ser. No. 427,164, now Patent No. 3,274,055, dated Sept. 20, 1966. Divided and this application Mar. 28, 1966, Ser. No. 537,633
U.S. Cl. 424—232 18 Claims
Int. Cl. A61k *21/00;* C07d *87/32*

ABSTRACT OF THE DISCLOSURE

This invention concerns pharmaceutical compositions of salts of N-morpholine ethanol and their use as tranquilizers.

The present invention relates to new and novel pharmaceutical compositions containing derivatives of morpholine ethanol, having novel pharmaceutical and therapeutic properties, their methods of manufacture and methods for achieving a tranquilizing muscle-relaxant effect. In particular, it relates to pharmaceutical compositions containing certain salts of morpholine ethanol, as for example, morpholine ethanol citrate, morpholine ethanol tartrate, morpholine ethanol salicylate, morpholine ethanol glutamate, morpholine ethanol nicotinate, morpholine ethanol malate, and morpholine ethanol maleate, the methods for their preparation and the methods of achieving a therapeutic effect by utilizing these compounds.

The present application is a divisional application of applicant's copending application, Ser. No. 427,164, filed Jan. 21, 1965, which has since matured into U.S. Patent No. 3,274,055, issued Sept. 20, 1966, and which was a continuation-in-part of applicant's then copending United States patent application, Ser. No. 243,646, filed Dec. 10, 1962, now abandoned, which was a continuation-in-part of applicant's then copending patent application, Ser. No. 101,346, filed Apr. 7, 1961, both of which are now abandoned.

Morpholine ethanol is a cyclized tertiary amino alcohol with an empiric formula of $C_6H_{13}O_2N$. The compound is a colorless liquid having a molecular weight of 131.2 and a boiling point of 226° C. The refractive index ($n_D^{20}$) of the molecule is 1.4765, while the specific gravity at 20° relative to water at the same temperature, is 1.072. Morpholine ethanol has been studied for its relative toxicity in connection; with cancer chemotherapy and found to be essentially nontoxic. The $LD_{50}$ of morpholine ethanol is 12.06 gm./kg., which is about the same magnitude as that of ethanol. Morpholine ethanol has been shown to have mild muscle-relaxant properties. Morpholine ethanol is a liquid, capable of being converted into a solid by forming salts, as for example, the hydrochloride and hydrobromide salts. When the organic salts are prepared, as for example, the acetate, formate, lactate, butyrate and stearate, the resultant compounds are oily, but when certain dibasic acids are used, such as the succinic acid, a solid compound will result. All of the salts of morpholine ethanol described in the literature are markedly hydroscopic, particularly the organic acid salts. This undesirable pharmaceutical property of being hydroscopic limits the utility of the compound for the manufacture of solid dosage forms. Thus, when the hydrochloride or hydrobromide salts and the organic acid salts are used, special drying agents must be added as well as humidity-controlled manufacturing rooms utilized, and special moisture resistant coatings placed about the finished solid dosage forms to provide stability.

These precautionary steps and added ingredients markedly increase the cost of manufacture of these agents as well as to interfere with proper absorption and therapeutic efficacy of the active ingredient. Furthermore, the use of these additive materials increase the size of the solid dosage form, resulting in a tablet or capsule of such large size as to cause difficulty in its administration.

Through the use of the salts of the present invention, solid derivatives of morpholine ethanol are obtained which are not not hydroscopic and are suitable for tablet, capsule and suppository manufacture, without the necessity for adding additive preservatives against liquifaction by inherent hydroscopicity. Furthermore, it will be found that the new compounds of the present invention are useful to produce a tranquilizing action in those patients suffering from anxiety states, and are safe and effective for use in animals and humans. These new agents do not cause injury to the liver; are not narcotic and not apt to cause addiction. It will be found that the administration of these new derivatives of morpholine ethanol by either the oral, rectal or parenteral routes will exert a beneficial therapeutic action. The new nonhydroscopic salts of morpholine ethanol are obtained by reacting the appropriate acid, as for example, nicotinic acid, salicylic acid, glutamic acid, citric acid, tartaric acid, maleic acid and malic acid, with morpholine ethanol in an inert solvent. Stoichiometric equivalent amounts of the respective reagents are used. An inert solvent, such as water, ethanol, isopropyl alcohol, dioxane, tetrahydrofurane or mixtures of these, may be used, as well as any other inert solvent in which the reagents are mutually soluble. The reagents are dissolved separately in the solvent and the solution of the acid component added slowly to the solution of the base component, while the mixture is being stirred. Gentle heat may be utilized to facilitate the reaction but this is not essential. The respective salt is obtained by fractional crystalization and is isolated and dried.

Because the above mentioned compounds (viz., the salts of morpholine ethanol described above) are essentially nontoxic and particularly suitable for use in therapy, tablets, capsules, suppositories, or solutions may be prepared to contain a dosage range of 100 mg. to 750 mg. of the active therapeutic compound per unit dose, which may be administered from 1 to 6 times daily.

In preparing a tablet of the active ingredient, which is a pharmacetutically acceptable salt of N-morpholine ethanol, it is desirable to make a base granulation containing a diluent, as for example, powdered sucrose, powdered lactose, powdered corn starch or powdered potato starch; a lubricating agent, as for example, gelatin, acacia, tragacanth, etc. Suitable coloring and flavoring may also be added to the base granulation. To this base granulation is then added the appropriate quantity of the pharmaceutically useful salts of morpholine ethanol, and the whole intimately mixed. To facilitate the uniform incorporation of the active ingredient into the tablet base granulation, it may be first dissolved in ethanol, using an amount just sufficient to achieve solution. In the ordinary course of manufacturing, it will be found convenient to utilize a volume of ethanol which is approximately twice that of the weight of active ingredient to be incorporated.

The mixture is uniformly moistened and screened through a coarse screen (No. 4 to 12 mesh), the size of screen depending upon the properties of the moistened material. The dampened material is then spread on drying trays, in thin layers, and dried at temperatures ranging between 45° and 60° C. When dry, the mixture is granulated through a No. 16 or No. 20 mesh screen and compressed into the desired tablet size and shape.

If it is desired to utilize the active ingredients, the salt of N-morpholine ethanol, in the form of capsule medication, then it may be preferred to mix the appropriate active therapeutic compound with a diluent or carrier, as for example, powdered corn starch, powdered lactose, powdered sucrose or powdered potato starch. The ratio of diluent to active ingredient may range from equal parts to one part of active ingredient in nine parts of diluent. After thorough mixing, the dry mixture is then filled into the desired capsule.

The preparation of suppositories for rectal administration may be conveniently carried out by mixing the active ingredient, the salt of N-morpholine ethanol with the desired suppository base material. Among the pharmaceutically desirable suppository bases which may be employed for this purpose, are carbowax, cocoa butter or glycerin-gelatin mixtures. Whatever the base utilized, the manufacturing procedures utilized are essentially the same. The active ingredient is incorporated by trituration with an appropriate quantity of suppository base compound. The mixture is then molded into the desired shape and size.

Solutions for parenteral use are prepared by dissolving the appropriate quantity of active material-for-injection, utilizing an aseptic technique and filling into glass ampules which are sealed by heat. The solution may be sterilized by autoclaving in the conventional manner.

Solutions for oral use are prepared by dissolving the active ingredient in a suitable vehicle, consisting of either sugar syrup, glycerine, propylene glycol, polyoxyethylene glycol, sorbitol, ethanol and water, or mixtures of these. Suitable aromatic and coloring agents may be added when desired. The concentration of active substance should be adjusted so that preferably one teaspoonful (5 ml.) constitutes a unit-dose, although larger volumes may be used. The following examples illustrate the scope of this invention.

EXAMPLE 1

In a round-bottom glass boiling flask fitted with a reflux condenser, a stirrer and an inlet tube, is placed a solution of 0.1 mol. of morpholine ethanol (B.P. 226° C., refractive index ($n_D^{21}$, 1.4765) dissolved in 500 cc. of isopropyl alcohol. To this solution is added 0.1 mol. of nicotinic acid dissolved in 200 cc. of isopropyl alcohol and the whole warmed at a temperature not exceeding 80° C. for one hour. The mixture is cooled and the solvent is distilled. The resultant residue is dissolved in the least amount of boiling water and allowed to cool. The nicotinic acid salt of morpholine ethanol are tan, needle-shaped crystals, melting at 223–226° C.

The compound analyzes in good agreement with the theoretical values for carbon, hydrogen and nitrogen.

Theory: C, 56.66%; H, 7.14%; N, 11.02%. Found: C, 59.59%; H, 6.12%; N, 10.74%.

Morpholine ethanol nicotinate is soluble in water and alcohol and insoluble in benzene and petroleum ether.

EXAMPLE 2

In place of the nicotinic acid used in Example 1, there may be substituted stoichiometric equivalent quantities of tartaric acid, citric acid, maleic acid, malic acid, glutamic acid and salicylic acid. The remainder of the steps are the same and the respective salt of morpholine ethanol, of the appropriate acid used, is obtained. The physical-chemical properties are described in Table I, appended.

TABLE I.—ELEMENTAL ANALYSIS

| Useful salt | Empiric formula | Physical state | Percent carbon | | Percent hydrogen | | Percent nitrogen | | Solubility |
|---|---|---|---|---|---|---|---|---|---|
| | | | Theory | Found | Theory | Found | Theory | Found | |
| N-morpholine ethanol tartrate | $C_{10}H_{19}NO_8$ | Solid needles, M.P. 145° C. | 42.68 | 42.91 | 6.81 | 6.95 | 4.98 | 5.12 | Soluble in water and ethanol. |
| N-morpholine ethanol maleate | $C_{10}H_{19}NO_7$ | Solid needles, M.P. 45° C. (softens at 40° C.). | 45.26 | 44.92 | 7.22 | 7.43 | 5.28 | 5.44 | Do. |
| N-morpholine ethanol maleate | $C_{10}H_{17}NO_6$ | Low melting solid [1] | 48.56 | 47.46 | 6.93 | 7.18 | 5.67 | 5.44 | Do. |
| N-morpholine ethanol glutamate | $C_{11}H_{22}N_2O_6$ | Platelets, M.P. 211–213° C. | 47.45 | 46.99 | 7.97 | 6.39 | 10.07 | 9.53 | Soluble in water and insoluble in ethanol. |
| N-morpholine ethanol nicotinate. | $C_{12}H_{18}N_2O_4$ | Needles, M.P. 223–226° C. | 56.66 | 56.59 | 7.14 | 7.12 | 11.02 | 10.34 | Soluble in water and ethanol |
| N-morpholine ethanol citrate | $C_{12}H_{21}NO_9$ | Needles, M.P. 105–108° C. | 44.56 | 44.21 | 6.55 | 6.24 | 4.33 | 4.01 | Do. |
| N-morpholine ethanol salicylate. | $C_{13}H_{19}NO_5$ | Needles, M.P. 60–62° C. | 57.96 | 58.42 | 7.12 | 7.40 | 5.20 | 5.41 | Do. |

[1] N-morpholine ethanol maleate is a low melting solid, softening at about 28° C., and is liquid above 30° C. It has a refractive index ($n_D^{25}$) of 1.4979 and a specific gravity (d 250)/4 of 1.2543.

EXAMPLE 3

To prepare tablets, 20 grams of morpholine ethanol citrate are mixed with 20 gm. of powdered corn starch. To this mixture is added 5 gm. of powdered lactose and 0.1 gm. of gum arabic, and the whole uniformly wetted with a mixture of 20 parts of ethanol and 80 parts of water. The uniformly wetted mass is then passed through a No. 16 mesh sieve and the resulting granules dried at about 45° C. To the dry granular material is then added 0.25 gram magnesium stearate and the resulting mixture is compressed into appropriately shaped tablets, each containing 200 mg. of morpholine ethanol citrate. Should it be desired to add coloring to the tablet, then any of the pharmaceutically suitable coloring agents is mixed in the appropriate amounts with the magnesium stearate and added to the mixture.

EXAMPLE 4

In place of the morpholine ethanol citrate used in Example 3 above, there may be substituted equivalent amounts of the pharmaceutically acceptable salts of morpholine ethanol, as for example, morpholine ethanol nicotinate, morpholine ethanol malate, morpholine ethanol maleate, morpholine ethanol glutamate, morpholine ethanol salicylate and morpholine ethanol tartrate, the remainder of the steps being the same.

EXAMPLE 5

Should it be desired to utilize the pharmaceutically acceptable salts of morpholine ethanol, in the form of capsules for oral administration to animals, then these may be prepared by filling an appropriate capsule directly with the active material so that each capsule contains 200 mg. of active material. Should it be desired to use a diluent in the preparation of the capsule dosage form, then powdered corn starch, powdered potato starch, powdered sucrose or powdered lactose may be used. The ratio of the diluent to the active ingredient may be from 1 to 10 parts of diluent for each part of active ingredient used. After suitable blending, the mixture is then filled into capsules of desired shape and size, so that each unit dose will contain 200 mg. of the appropriate active ingredient.

EXAMPLE 6

Solutions for oral administration may be prepared by dissolving the pharmaceutically acceptable salts of morpholine ethanol in a non-toxic liquid vehicle or carrier, as for example, water, ethanol, glycerin, propylene glycol, polyoxyethylene glycol, or mixtures of these. Suitable flavoring and coloring agents may be added if desired.

A liquid dose form of the pharmaceutically acceptable salts of morpholine ethanol should be adjusted in volume, preferably so that each unit dose of 5 cc. (teaspoonful) will contain 200 mg. of the active base compound, morpholine ethanol, although larger or smaller unit doses may be used.

EXAMPLE 7

Suppositories of the pharmaceutically acceptable salts of N-morpholine ethanol, may be prepared by mixing the selected therapeutic compound with a suitable suppository vehicle, such as cocoa butter, polyoxyethylene glycol of a molecular weight from 2,000 to 6,000 (these latter compounds are known to commerce as "Carbowax") or glycerin-gelatin compositions. The appropriate quantity of the active therapeutic compounds is dispersed in the suppository base material by either trituration or admixture while the base composition is in a molten state. After the suppository mass has been formed, pharmaceutically desirable suppositories may be obtained by extrusion or molding. The range in concentration of active compound for each suppository is from 100 to 750 mg. of the active ingredient, with a preferred range of 200 mg. per suppository.

EXAMPLE 8

When it is desired to obtain a blood level of the pharmaceutically acceptable salts of morpholine ethanol, then this may be accomplished by administering a preferred dosage form, such as tablets, capsules, suppositories or liquid preparations, by either the oral, rectal or parenteral routes. The active therapeutic compound is rapidly absorbed from the gastrointestinal tract or the particular tissue site and appears in the blood stream within 15 minutes to one-half hour after administration. The peak blood level is observed within 1 to 2 hours after administration of the drug. The blood level of the active ingredient persists, decreasing slowly as the drug is excreted through the normal metabolic pathways. A uniform blood concentration of the drug may be maintained by administering intermittent dosages during the day. The compound may be administered for prolonged periods of time without addiction or cumulative toxic manifestations. Such blood levels of the active ingredient as develop after the administration of the appropriate dosage form will be found useful for the relief of anxiety tension states or tension-induced muscle spasm. The exact daily dosage requirements of the patient will depend upon the intensity and depth of symptoms evidenced by the individual patient. A range in dosage of from 100 mg. to 750 mg. of the active therapeutic compound may be administered from 1 to 6 times daily. However, it will be found that 200 mg. of the active therapeutic compound, administered 3 to 4 times per day, will be adequate to generally relieve the anxiety tension state of the average patient.

It is not desired to be limited except as set forth in the following claims, the above description being by way of illustration of the invention.

What is claimed is:

1. A pharmaceutical composition in unit dosage form comprising a pharmaceutical carrier and from 100 mg. to 750 mg. of a compound selected from the group consisting of N-morpholine ethanol tartrate, N-morpholine ethanol malate, N-morpholine ethanol maleate, N-morpholine ethanol glutamate, N-morpholine ethanol nicotinate, N-morpholine ethanol citrate and N-morpholine ethanol salicylate.

2. A pharmaceutical composition as described in claim 1, said compound being N-morpholine ethanol tartrate.

3. A pharmaceutical composition as described in claim 1, said compound being N-morpholine ethanol malate.

4. A pharmaceutical composition as described in claim 1, said compound being N-morpholine ethanol maleate.

5. A pharmaceutical composition as described in claim 1, said compound being N-morpholine ethanol glutamate.

6. A pharmaceutical composition as described in claim 1, said compound being N-morpholine ethanol nicotinate.

7. A pharmaceutical composition as described in claim 1, said compound being N-morpholine ethanol citrate.

8. A pharmaceutical composition as described in claim 1, said compound being N-morpholine ethanol salicylate.

9. The method of achieving an elevated blood level of morpholine ethanol which comprises the step of administering to a patient a therapeutically sufficient quantity of a compound selected from the group consisting of N-morpholine ethanol tartrate, N-morpholine ethanol malate, N-morpholine ethanol maleate, N-morpholine ethanol glutamate, N-morpholine ethanol nicotinate, N-morpholine ethanol citrate, and N-morpholine ethanol salicylate.

10. The method of claim 9, said compound being administered in unit dosage form, each unit dose containing from 100 mg. to 750 mg. of said compound.

11. The method of claim 9, said compound being N-morpholine ethanol tartrate.

12. The method of claim 9, said compound being N-morpholine ethanol malate.

13. The method of claim 9, said compound being N-morpholine ethanol maleate.

14. The method of claim 9, said compound being N-morpholine ethanol glutamate.

15. The method of claim 9, said compound being N-morpholine ethanol nicotinate.

16. The method of claim 9, said compound being N-morpholine ethanol citrate.

17. The method of claim 9, said compound being N-morpholine ethanol salicylate.

18. The method of achieving a transquilizing action in an animal which comprises the step of administering to said animal a therapeutically sufficient quantity of the pharmaceutical composition of claim 1.

References Cited

UNITED STATES PATENTS 3,274,055 9/1966 Halpern.

ALBERT T. MEYERS, *Primary Examiner.*

S. J. FRIEDMAN, *Assistant Examiner.*

U.S. Cl. X.R.

424—248